UNITED STATES PATENT OFFICE.

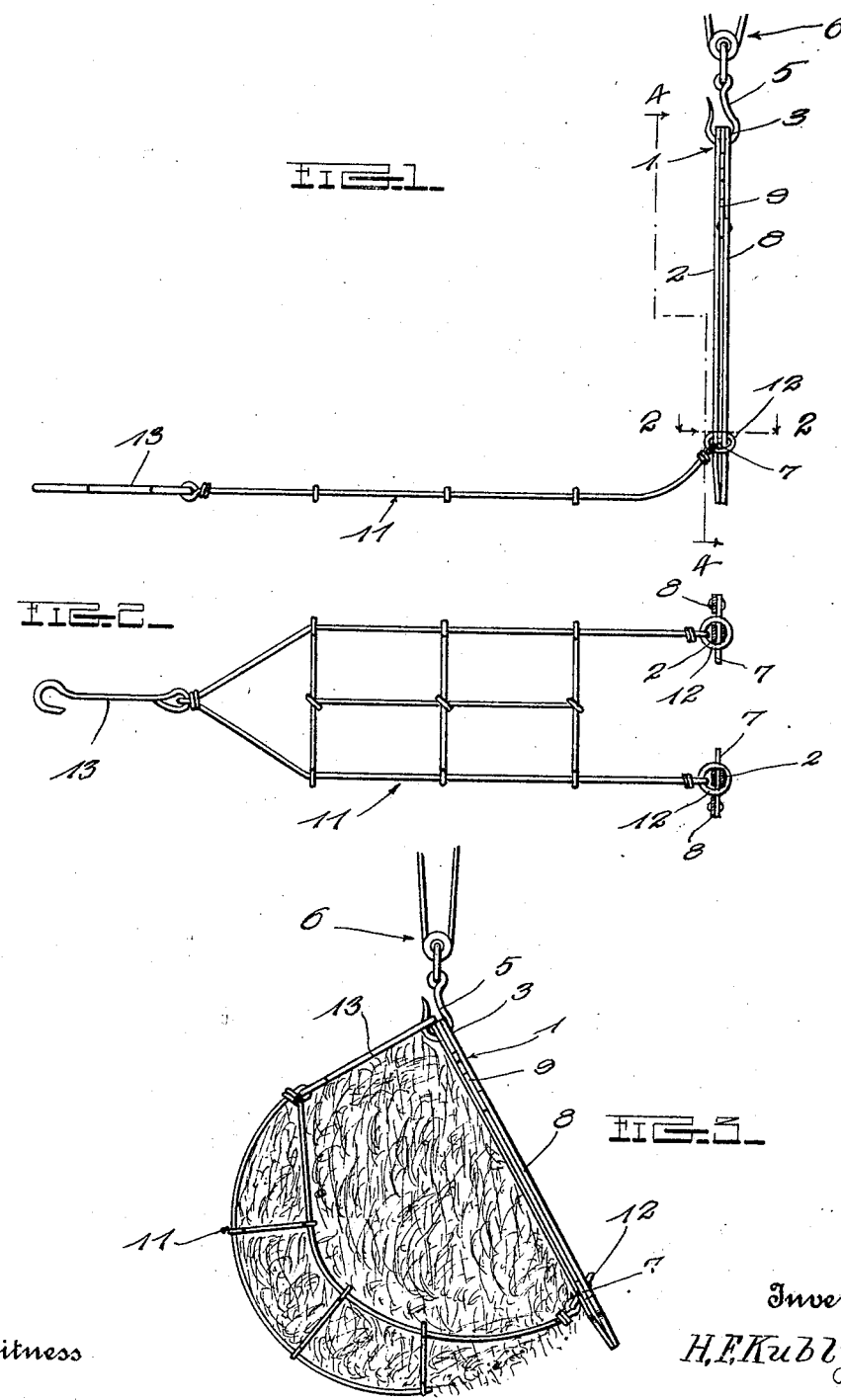

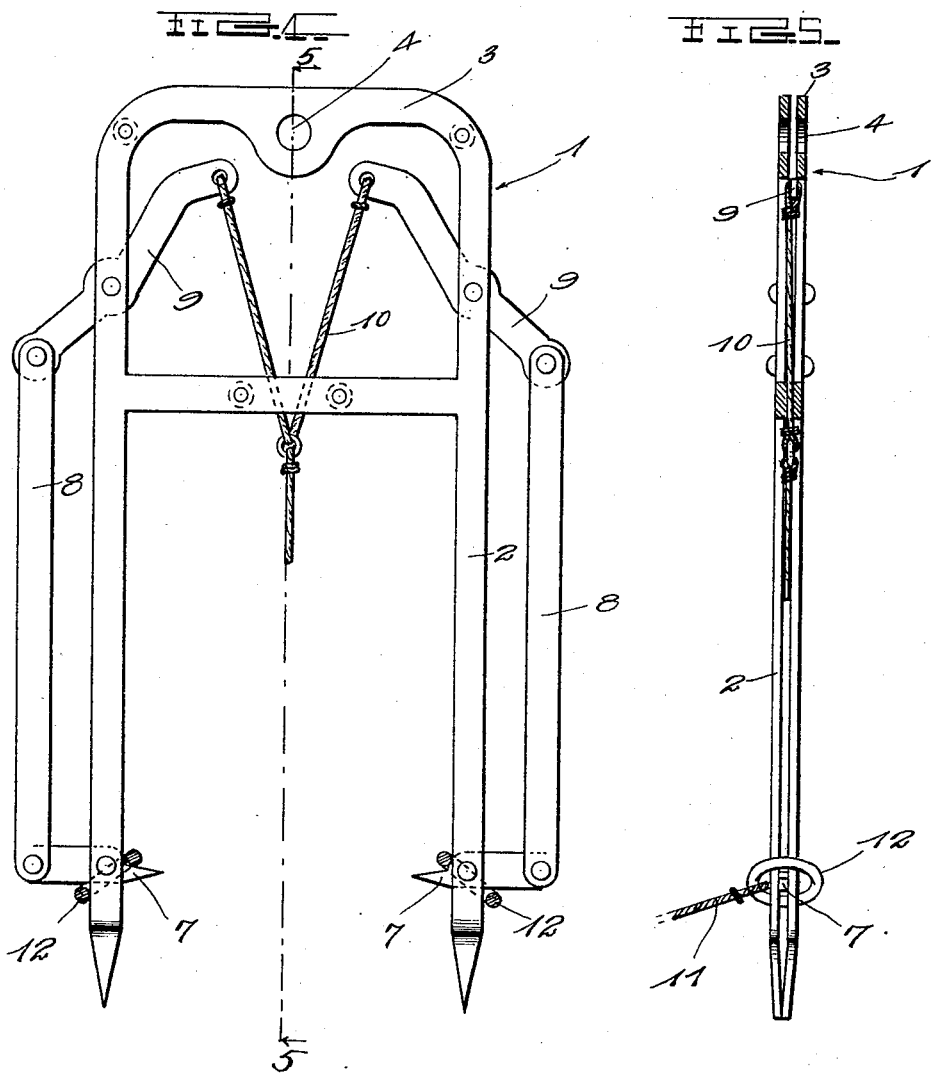

HENRY F. KUBLY, OF MONTICELLO, WISCONSIN.

HAY-SLING.

1,319,291. Specification of Letters Patent. Patented Oct. 21, 1919.

Application filed June 26, 1919. Serial No. 306,788.

*To all whom it may concern:*

Be it known that I, HENRY F. KUBLY, a citizen of the United States, residing at Monticello, in the county of Green and State of Wisconsin, have invented certain new and useful Improvements in Hay-Slings; and I do declare the following to be a full, clear, and exact description of the invention, such as will enable others skilled in the art to which it appertains to make and use the same.

My invention has for its principal object to provide a simply constructed and inexpensive, yet a highly efficient, reliable, and easily operated sling which may be used in connection with an ordinary hay hoisting fork of the type having projectable barbs to prevent slippage of the hay therefrom until it has been carried to the required point; and in carrying out this object, a further object is to provide one end of the sling with eyes to receive the tines of the fork and to be held against slipping therefrom by the barbs, and to equip the other end of the sling with means for attaching it to the suspending hook of the fork. By this arrangement, a large amount of hay may be confined between the fork and the sling and when the barbs of the former are retracted, the sling will be released to dump the load.

With the foregoing in view, the invention resides in the novel construction and association of parts hereinafter described and claimed, reference being made to the accompanying drawings.

Figure 1 is an edge view of a hay fork and the sling attached at one end thereto, preparatory to loading.

Fig. 2 is a horizontal section of the fork on the plane of line 2—2 of Fig. 1, showing a plan view of the sling.

Fig. 3 is an elevation showing the manner in which the fork and sling coöperate in lifting the hay.

Fig. 4 is a vertical section on the plane indicated by the line 4—4 of Fig. 1, showing more clearly the manner of connecting one end of the sling with the usual hay fork.

Fig. 5 is a vertical section on the plane of line 5—5 of Fig. 4.

In the drawings I have illustrated a common form of hay hoisting fork which includes the usual arched frame 1 whose sides 2 form tines and whose crown 3 is provided with an opening 4 to receive a hook 5 on any preferred block and tackle mechanism or the like 6. The tines 2 are equipped with the usual pivoted barbs 7 controlled by the links 8, levers 9, and trip cable 10. All of these parts are of well known construction and form no part of the present invention except in their association with the sling 11.

The sling 11 is of elongated net like form, one end of said sling being provided with a pair of rings or eyes 12 of a size to receive the tines 2, while the other end of said sling is equipped with a hook or the like 13 for engagement with the hook 5. The sling 11 is of much greater length than the height of the fork 1 and the shank of the hook 13 is of such length as to space the upper end of said sling a considerable distance from the fork.

The barbs 7 are projectable through the rings 12 to normally hold them against slipping from the tines 2, and when the sling is loaded, the hook 13 is engaged with the hook 5 as seen in Fig. 3. The load is now hoisted to the required point and the trip cable 10 is pulled, with the result that the barbs 7 are retracted. This allows the eyes 12 to slide from the tines 2 and dumps the load.

The device is of extremely simple and inexpensive nature, may be used expeditiously in connection with numerous forms of hay forks, and may be easily attached and detached whenever required.

I claim:

The combination with a hay hoisting fork including a pair of tines, projectable barbs carried by said tines, releasing means for said barbs, and a hook connected with the crown of the fork for elevating the same; of an elongated hay sling having a pair of spaced rings at one end for passage over the lower ends of said tines and for retention on said tines by said barbs, and a hook on the other end of said sling for connecting it with the aforesaid hook, whereby the hay may be confined between said sling and said fork.

In testimony whereof I have hereunto set my hand.

HENRY F. KUBLY.

Copies of this patent may be obtained for five cents each, by addressing the "Commissioner of Patents, Washington, D. C."